United States Patent
Jeong

(10) Patent No.: US 6,341,024 B1
(45) Date of Patent: Jan. 22, 2002

(54) CHANNEL MONITORING APPARATUS IN A WAVELENGTH DIVISION MULTIPLEXING SYSTEM

(75) Inventor: Ku Hong Jeong, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/178,034

(22) Filed: Oct. 22, 1998

(30) Foreign Application Priority Data

Dec. 30, 1997 (KR) ............................................ 97-79470

(51) Int. Cl.[7] .......................... H04J 14/02; H04B 10/08
(52) U.S. Cl. .................... 359/130; 359/110; 359/177
(58) Field of Search ............................ 359/110, 133, 359/130, 124, 177, 127

(56) References Cited

U.S. PATENT DOCUMENTS

| | | | | |
|---|---|---|---|---|
| 5,513,029 A | * | 4/1996 | Roberts ...................... | 359/177 |
| 5,654,816 A | * | 8/1997 | Fishman ..................... | 359/177 |
| 5,712,716 A | * | 1/1998 | Vanoli et al. ............... | 359/125 |
| 5,870,216 A | * | 2/1999 | Brock et al. ................ | 359/172 |
| 5,986,782 A | * | 11/1999 | Alexander et al. .......... | 359/110 |
| 6,111,688 A | * | 8/2000 | Kobayashi et al. ......... | 359/341 |
| 6,134,034 A | * | 10/2000 | Terahara .................... | 359/124 |

* cited by examiner

Primary Examiner—Leslie Pascal
(74) Attorney, Agent, or Firm—Long Aldridge & Norman, LLP

(57) ABSTRACT

A channel monitoring apparatus in a WDM system comprises: a plurality of tap couplers each for tapping a multiplexed optical signal at a predetermined percent at each monitoring point; an optical switch for selecting one of the monitoring points and optically switching an optical signal tapped by a relevant one of the tap couplers; an AWG module for dividing the optical signal switched by the switch by channels of the WDM system; a plurality of optical detectors for converting signals received from the AWG module into electric signals; a plurality of trans-impedance circuits for converting the electric signals converted by the detectors into voltage values proportional to current values of the signals; a channel multiplexer for selecting one of signals converted by the trans-impedance circuits; a fourth amplifier for amplifying the signal selected by the channel multiplexer; an analog/digital converter for converting the signal amplified by the fourth amplifier into a digital signal before applying it to a microprocessor; and a microprocessor for checking existence/non-existence of each channel and computing gains of the amplifiers with respect to each channel.

17 Claims, 5 Drawing Sheets

CHANNEL MONITORING APPARATUS IN A WAVELENGTH DIVISION MULTIPLEXING SYSTEM

BACKGROUND OF THE INVENTION

1. Field of the Invention

The present invention relates to a wavelength division multiplexing (WDM) system and particularly to a channel monitoring apparatus in a WDM system configured for monitoring of channels of a multiplexed optical signal at each channel monitoring point using an arrayed-waveguide grating (AWG).

2. Discussion of Related Art

A method for monitoring channels in a typical WDM system employs a tone frequency. A configuration for implementing this method, as shown in FIG. 1, includes: a plurality of optical transmitter modules 11-1 to 11-N for transmitting optical signal channels, each channel having a unique tone frequency; an optical multiplexer 12 for multiplexing the optical signals received from the plural optical transmitter modules 11-1 to 11-N; a post-amplifier 13 as a first amplifier, an in-line amplifier 14 as a second amplifier, and a pre-amplifier 15 as a third amplifier each for amplifying a multiplexed signal produced by the optical multiplexer 12 before transmission; a post-signal processor 131, an in-line signal processor 141, and a pre-signal processor 151 which are coupled to each amplifier (13, 14, 15), each for processing monitoring signals at monitoring points to monitor each channel; and an optical demultiplexer 16 for demultiplexing a signal amplified and applied by the pre-amplifier 15 which is the third amplifier.

The plural optical transmitter modules 11-1 to 11-N, each includes: an oscillator 111 for oscillating bias current of a laser diode to make a channel have a unique frequency; and a laser diode 112 for producing an optical signal of the channel in response to the frequency generated by the oscillator 111.

In the WDM system having such configuration as illustrated above, operation of monitoring the channels is as follows. First, the oscillators 111 disposed within the multiple optical transmitter modules 11-1 to 11-N make each channel have each unique tone frequency f1 to fn through oscillation and apply each tone frequency to the respective corresponding laser diodes 112.

Each laser diode 112 superimposes a fine electric signal where a channel has a unique frequency according to corresponding bias current so as to produce an optical signal of the channel and applies the optical signal to the multiplexer 12.

Subsequently, the optical multiplexer 12 multiplexes the optical signals from the plural optical transmitter modules 11-1 to 11-N and applies a multiplexed optical signal to the post-amplifier 13 which is the first amplifier. The post-amplifier 13 amplifies the multiplexed optical signal received from the optical multiplexer 12. The amplified optical signal is subsequently transmitted to and amplified by the first and second amplifiers 14 and 15 and then transmitted to the optical demultiplexer 16.

The optical demultiplexer 16, in turn, demultiplexes the amplified signal received from the third amplifier 15 and outputs each demultiplexed signal $\lambda 1$ to $\lambda n$ to the WDM system.

At this time, the post-signal processor 131, in-line signal processor 141, and pre-signal processor 151, which are respectively connected to the first, second, and third amplifiers 13, 14, and 15, each converts a portion of the multiplexed optical signal produced by the optical multiplexer 12 into an electric signal at each channel monitoring point and performs a signal processing operation for obtaining information about a relevant channel from the converted electric signal.

The signal processing operation for obtaining the information about each channel from each converted electric signal is effected by using a band pass-filter with respect to each channel or using digital signal processing (DSP) technology after converting the electric signal into a digital signal.

However, it is accompanied by complication to implement a circuit for generating the tone frequencies at the multiple optical transmitter modules 11-1 to 11-N and a circuit for the post-signal processor 131, in-line signal processor 141, and pre-signal processor 151 for monitoring of the channels at each channel monitoring point. Furthermore, various tone frequencies for different usage should be disposed at significant frequency spacings between the channels using the multiple optical transmitter modules 11-1 to 11-N. The number of channels having individually generated tone frequencies is therefore limited. The WDM system limits the number of the channels, thus causing restriction on capacity of the WDM system.

As illustrated above, in the conventional WDM system, implement of the circuits for generating the tone frequencies and monitoring the channels is accompanied by complication and, moreover, the tone frequencies should be disposed at significant frequency spacings with respect to each adjacent channel. This causes restriction on the number of the channels. Consequently, the number of the channels used in the WDM system is limited. In addition to the problem of limiting the whole capacity of the system, optical signals of each channel must pass through a complicated optical/electric/optical (O/E/O) conversion procedure while performing the signal processing operations for obtaining the information on each channel even though each optical signal has a wavelength corresponding to one of the WDM channels.

SUMMARY OF THE INVENTION

Accordingly, the present invention is directed to a channel monitoring apparatus in a WDM system that substantially obviates one or more of the limitations and disadvantages of the related art.

An objective of the present invention is to provide a channel monitoring apparatus for monitoring each channel of a multiplexed optical signal produced by a multiplexer using an AWG at each channel monitoring point in the WDM system to check existence/non-existence of each channel, optical signal to noise ratios (OSNRs), and flatnesses and stabilities of gains of optical amplifiers with respect to each channel, thereby facilitating operation, administration, and maintenance of the relevant system and simplifying a complicated conversion procedure where the optical signal is converted into an electric signal and then converted into an optical signal again.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a channel monitoring apparatus in a WDM system, includes: a plurality of laser diodes for transmitting optical signals having different unique wavelengths used in the WDM system; a multiplexer for multiplexing the optical signals received from the plurality of laser diodes; at least one optical amplifier for amplifying a multiplexed signal received from the multiplexer; a demultiplexer for demultiplexing a signal amplified by the at least one amplifier; and a channel monitoring unit for extracting signals at each channel monitoring point disposed between the amplifiers and then monitoring existence/non-existence of each channel and detecting gains of the amplifiers with respect to each channel using an AWG module. The channel monitoring unit includes: a plurality of tap couplers each for tapping the multiplexed optical signal at a predetermined percent at the each monitoring point; a switch for selecting one of the monitoring points and optically switching an optical signal tapped by a relevant one of the tap couplers; an AWG module for dividing the optical signal switched by the switch by channels of the WDM system; a plurality of optical detectors for converting optical signals received from the AWG module into electric signals; a plurality of trans-impedance circuits for converting the electric signals converted by the optical detectors into voltage values proportional to current values of the signals; a channel multiplexer for selecting one of signals converted by the trans-impedance circuits; a fourth amplifier for amplifying the signal selected by the channel multiplexer; an analog/digital converter for converting the analog signal amplified by the fourth amplifier into a digital signal before applying it to a microprocessor; and a microprocessor for checking existence/non-existence of each channel and computing gains of the amplifiers with respect to each channel.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

The following description with reference to the accompanying drawings concerns this invention which monitors each channel of a multiplexed optical signal at each channel monitoring point using an AWG.

Figure 1:
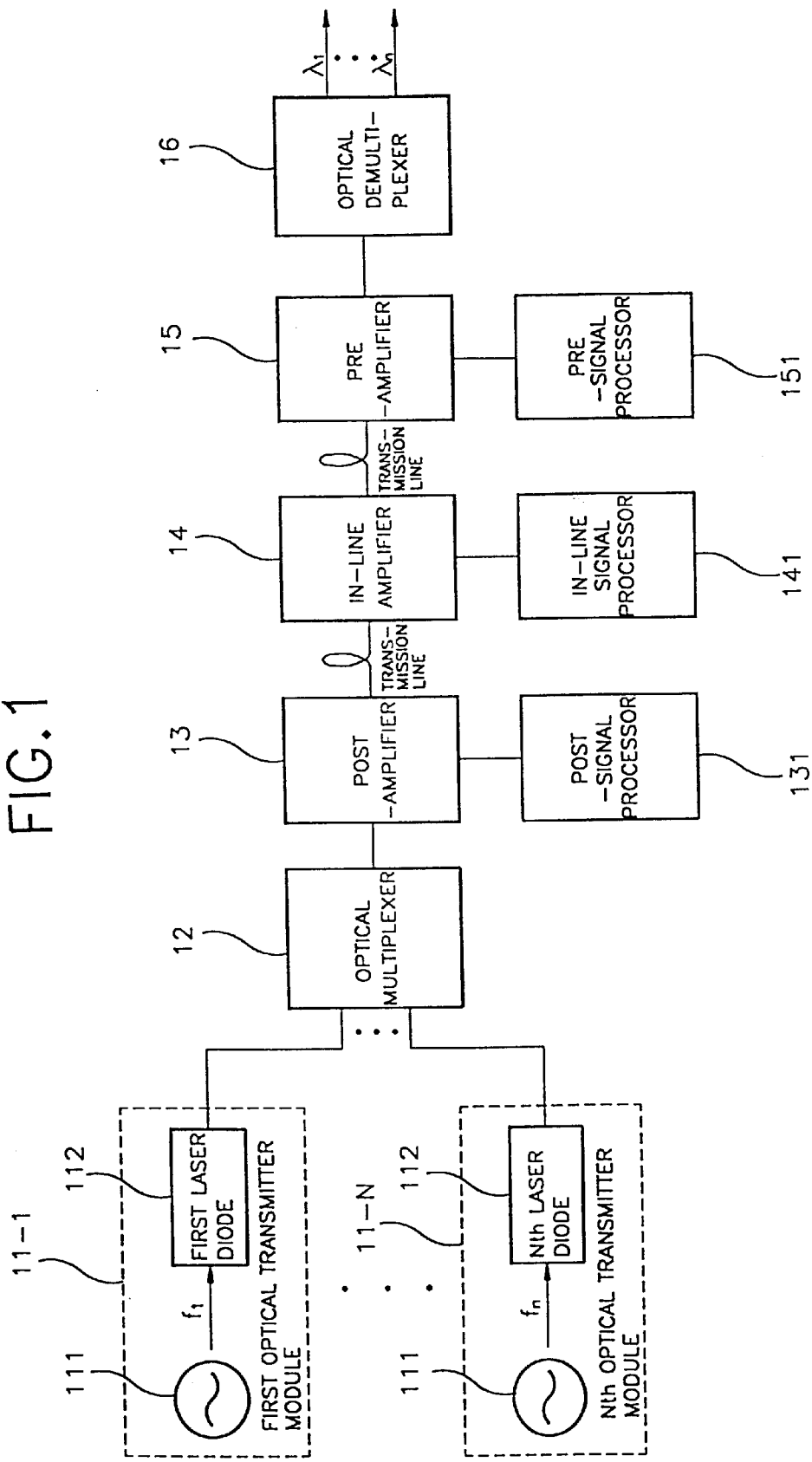
FIG. 1 is a block diagram showing a configuration of a conventional WDM system.
Figure 2:
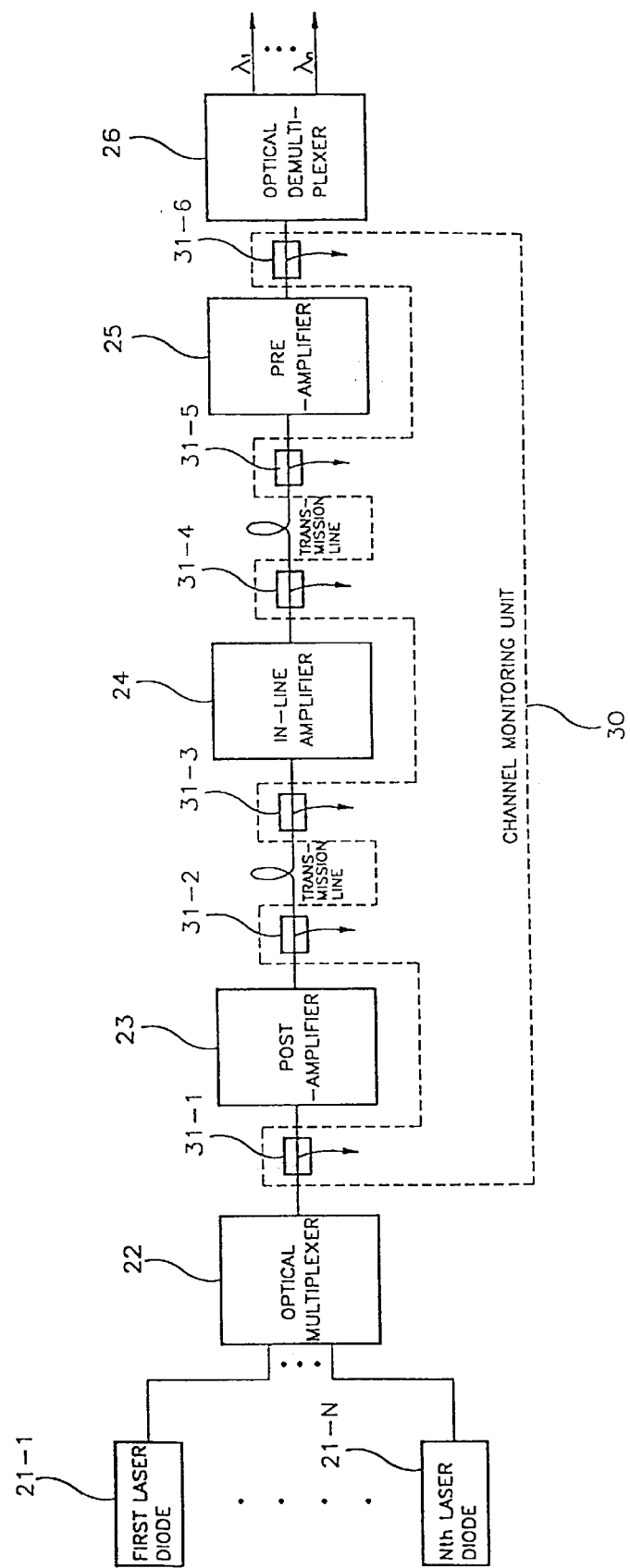
FIG. 2 is a block diagram showing a configuration of a WDM system according to an embodiment of the present invention.

As shown in FIG. 2, a WDM system according to an embodiment of the present invention includes: a plurality of laser diodes 21-1 to 21-N for transmitting optical signals having different unique wavelengths $\lambda 1$ to $\lambda n$ used in the WDM system; an optical multiplexer 22 for multiplexing the optical signals received from the laser diodes 21-1 to 21-N; first, second, and third amplifiers 23, 24, and 25 for amplifying and transmitting a multiplexed signal produced by the optical multiplexer 22; an optical demultiplexer 26 for demultiplexing an amplified signal received from the third amplifier 25; and a channel monitoring unit 30 for monitoring the channels at each channel monitoring point disposed between the optical multiplexer 22, the first amplifier 23, the second amplifier 24, and the third amplifier 25 using an AWG module 33.

Figure 3:
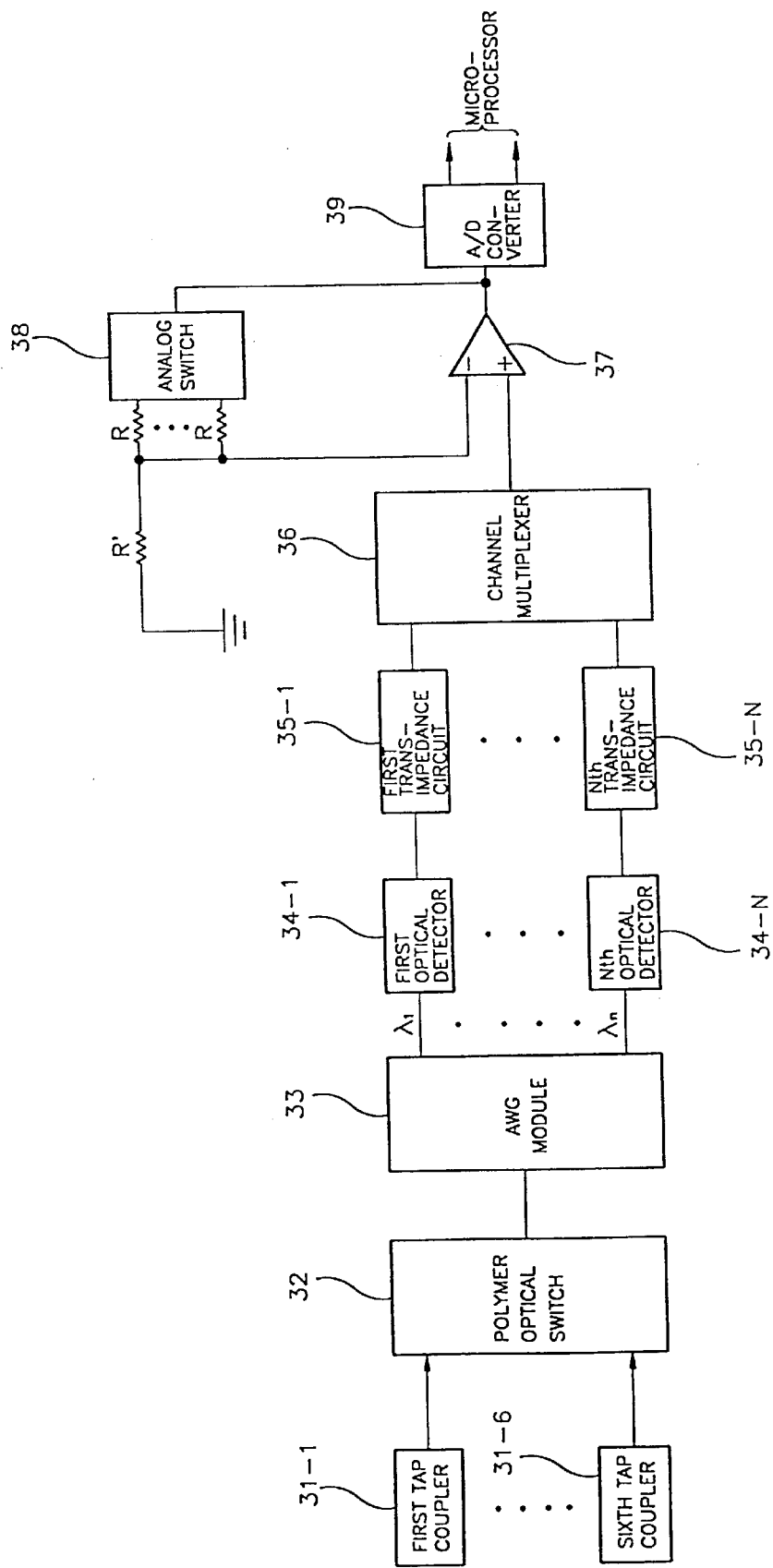
FIG. 3 is a block diagram showing a configuration of a channel monitoring unit depicted in FIG. 2.

The channel monitoring unit 30, as shown in FIG. 3, includes: a plurality of tap couplers 31-1 to 31-6 each for tapping a predetermined percent of a multiplexed optical signal at each channel monitoring point 31-1 to 31-6; an 8×1 polymer optical switch 32 for optically selecting one of the optical signals which have been tapped and applied by the tap couplers 31-1 to 31-6 through switching operation; an AWG module 33 for dividing an optical signal switched by the polymer optical switch 32 into signals of different wavelengths $\lambda 1$ to $\lambda n$; a plurality of optical detectors 34-1 to 34-N for respectively converting optical signals divided and outputted by the AWG module 33 via each output port of the AWG module 33 into electric signals; a plurality of trans-impedance circuits 35-1 to 35-N for respectively converting the electric signals received from each optical detector 34-1 to 34-N into voltage values in proportion to current values of each electric signal; a channel multiplexer 36 for selecting one of the signals received by each trans-impedance circuit 35-1 to 35-N; an operational (OP) amplifier 37 as a fourth amplifier for amplifying a signal selected and applied by the channel multiplexer 36 to increase a level of the signal up to a predetermined level according to gain control by an analog switch 38; the analog switch 38 for regulating the signal channel selected by the channel multiplexer 36 to a proper gain according to a relevant channel monitoring point; an analog/digital (A/D) converter 39 for converting an amplified analog signal received from the fourth amplifier 37 into a digital signal; and a microprocessor for processing the digital signal received from the A/D converter 39 to identify existence/non-existence of a relevant channel and obtain an OSNR, a gain flatness used for determining whether a deviation of a gain with respect to the relevant channel is maintained below a specified value, and a gain stability used for checking whether a gain deviation with respect to the number of channels in use is maintained below a specified value.

With reference to FIGS. 2 to 5, operation of the channel monitoring apparatus in the WDM system according to an embodiment of the present invention will now be described in detail.

First, the plural laser diodes 21-1 to 21-N in the WDM system produce optical signals having different wavelengths $\lambda 1$ to $\lambda n$ and apply them to the optical multiplexer 22. The optical multiplexer 22 multiplexes the optical signals received from each laser diode 21-1 to 21-N. Then a multiplexed optical signal produced by the optical multiplexer 22 is sequentially applied to the first amplifier 23, the second amplifier 24, and the third amplifier 25.

The first, second, and third amplifiers 23, 24, and 25 sequentially amplify the multiplexed optical signal produced by the optical multiplexer 22, and the amplified multiplexed optical signal is transmitted to the optical demultiplexer 26. The optical demultiplexer 26 demultiplexes the amplified optical signal received from the third amplifier 25 into the WDM system.

At this time, the channel monitoring unit 30 monitors the channels at each channel monitoring point 31-1 to 31-6 disposed between the first amplifier 23, the second amplifier 24, and the third amplifier 25 using the AWG module 33 in such a manner that selects a monitoring point to be monitored among the monitoring points 31-1 to 31-6 of the channel monitoring unit 30 using the polymer optical switch 32. For example, if the first monitoring point is selected, the first tap coupler 31-1 coupled to the selected first monitoring point taps a multiplexed optical signal at a predetermined percent. Then the polymer optical switch 32 selects only the signal tapped by the first tap coupler 31-1.

If the first tap coupler 31-1 taps the multiplexed optical signal at 1% in this case, it just passes 99% of the multiplexed optical signal to the first amplifier 23 while tapping and applying the remaining 1% of the optical signal to the polymer optical switch 32.

Hence, the polymer optical switch 32 selectively receives the optical signal tapped and applied by the first tap coupler 31-1 and optically switches the tapped optical signal to the AWG module 33.

Figure 4:
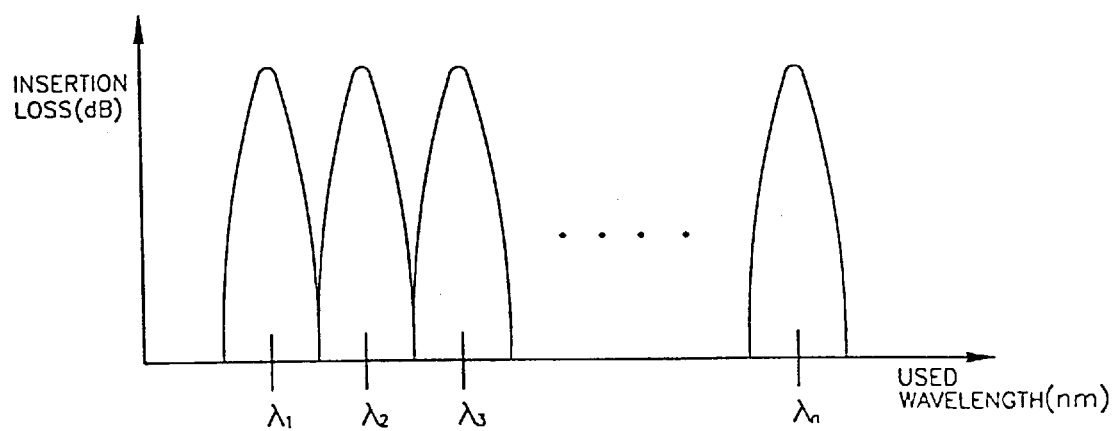
FIG. 4 is a graph illustrating a transmission characteristic of an AWG module depicted in FIG. 3.
Figure 5:
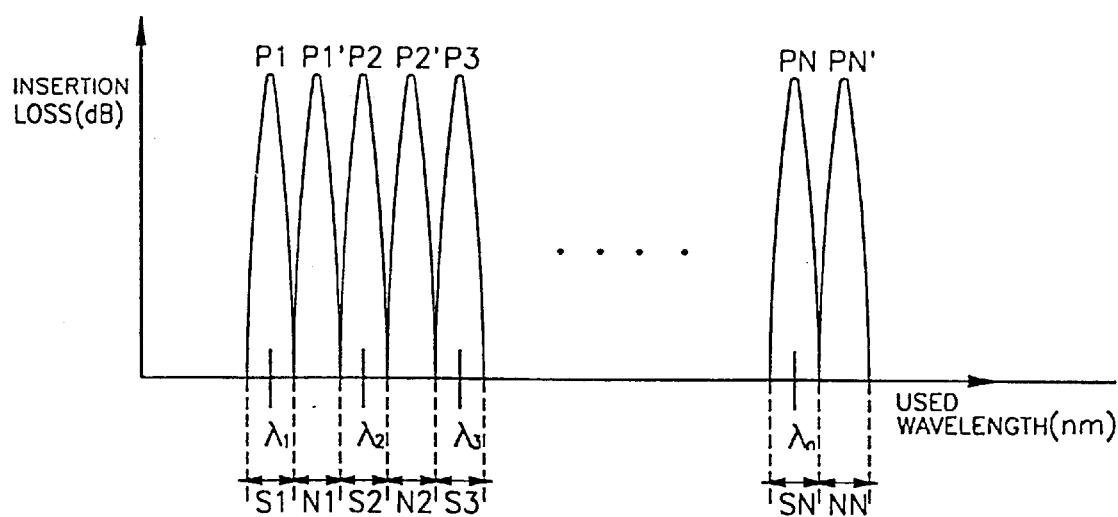
FIG. 5 is a graph illustrating a transmission characteristic of an AWG module having twice as many channels as the AWG module depicted in FIG. 3 has.

The AWG module 33 divides the optical signal switched by the polymer optical switch 32 into signals by each wavelength λ1 to λn and applies divided optical signals having transmission characteristics as shown in a graph depicted in FIG. 4 to respective optical detectors 34-1 to 34-N.

The optical detectors 34-1 to 34-N, in turn, respectively convert the optical signals of each channel applied by the AWG module 33 via each output port of the module 33 into electric signals. By allowing current proportional to an optical power of an optical signal of each channel applied by the AWG module 33 to flow across each trans-impedance circuit 35-1 to 35-N, the trans-impedance circuits 35-1 to 35-N for each channel respectively convert the current values applied to each channel by the respective optical detectors 34-1 to 34-N into voltage values. The voltage values of each channel represent the optical power of the optical signals of each channel. Each trans-impedance circuit 35-1 to 35-N applies an analog signal which is the voltage value of the signal power of a corresponding channel to the channel multiplexer 36.

The channel multiplexer 36 selects one of the analog signals corresponding to each channel received from each trans-impedance circuit 35-1 to 35-N and applies a selected analog signal to the fourth amplifier 37. The fourth amplifier 37 amplifies the analog signal selected by the channel multiplexer before applying it to the A/D converter 39.

The A/D converter 39 converts the analog signal amplified and applied by the fourth amplifier 37 into a digital signal before applying it to the microprocessor. The microprocessor then checks whether or not a signal of a corresponding channel exist, that is, it monitors existence/nonexistence of the corresponding channel.

In this case, the optical signals tapped and forwarded at each channel monitoring point have different optical power, so errors can occur in resolution of the A/D converter 39. To compensate for this, gains are regulated using the analog switch 38. The analog switch 38 regulates an amplification rate of the fourth amplifier 37 to regulate a gain of the signal selected and applied by the channel multiplexer 36 according to the corresponding channel monitoring point. The fourth amplifier 37 amplifies the analog signal selected and applied by the channel multiplexer 36 according to the regulation of the amplification rate by the analog switch 38, before sending it to the A/D converter 39.

According to the operation as described above, the channel monitoring unit 30 measures optical power of the input and output optical signals of the first, second, and third amplifiers. The microprocessor in the channel monitoring unit 30 calculates gain flatnesses through which it is determined that almost same gains having a gain deviation below a specified value can be obtained with respect to each channel at the respective first, second, and third amplifiers 23, 24, and 25 and gain stabilities through which it is determined that deviations of the gains with respect to each channel are below a specified value when one or more channels are inputted to each amplifier, thereby effecting monitoring.

In case of using the AWG module 33 having twice as many channels as used by the WDM system described above, as shown in FIG. 5, all the channels, whether or not used for a service, are simultaneously observed, so the microprocessor can calculate the OSNRs of each channel.

References "P1, P1', ..., PN, PN'" indicate each output port of the AWG module 33. References "S1, ..., SN" indicate signals, and "N1, ..., NN" indicate noises. In this regard, each OSNR can be calculated by using output signals of each output port, P1 to PN and P1' to PN', of the AWG module 33. For example, the OSNR at the first output port, P1, corresponds to a result of dividing a level of the first signal, S1, by a level of the first noise, N1. In other words, each OSNR is calculated like P1/P1', P2/P2', ..., PN/PN'.

The channel monitoring operation of the channel monitoring unit 30 will now be described with an example. When a channel of which the power is about 0 dBm in normal status is inputted into one of the trans-impedance circuit 35-1 to 35-N via one of the optical detector 34-1 to 34-N and converted into a voltage value of 3V by the relevant one of the trans-impedance circuits 35-1 to 35-N, the voltage value of 3V is converted into a 8-bit digital value and stored. If the voltage value is suddenly reduced to 0.8V at a certain point, it can be determined such that the corresponding channel does not exist.

If a strength of an optical signal outputted from a noise port (P1', ..., PN') among the output ports of the AWG module 33 is detected to be about 0.8V by the relevant optical detector (34-1 to 34-N), the voltage value, 0.8V, corresponds to a power of a noise. If an optical power of an optical signal outputted from a signal output port (P1 to PN) of the AWG module 33 is detected and converted into 3V by the relevant optical detector (34-1 to 34-N), the voltage value, 3V, corresponds to a power of the signal. In this regard, a rate of the relevant signal power (3V) to the relevant noise power (0.8V) corresponds to an OSNR of the relevant signal.

The gains of the first, second, and third amplifiers 23, 24, and 25 with respect to each channel can be obtained by detecting and computing the optical power of the signals before and after the respective first, second, and third amplifiers 23, 24, and 25. Through this operation, the flatnesses and the stabilities of gains with respect to each channel at each amplifier can be processed and monitored through a real time operation.

According to the present invention as illustrated, an optical signal tapped by a tap coupler at a relevant channel monitoring point between the optical amplifiers is selectively switched by the polymer optical switch and then divided by each wavelength by the AWG module. Subsequently, divided signals are detected by the optical detectors and converted into voltage values by the trans-impedance circuits. A signal channel selected by the channel multiplexer is applied to the fourth amplifier. Here, an amplification rate of the fourth amplifier is regulated to a compensated amplification rate corresponding to the relevant channel under the control of the analog switch. The signal is then converted into a digital signal by the A/D converter and applied to the microprocessor. Consequently, through monitoring of the channels in a multiplexed optical signal, existence/non-existence of each channel is checked and OSNRs and gains of each optical amplifier with respect to each channel are obtained, thereby facilitating operation, administration, and maintenance of the relevant system.

It will be apparent to those skilled in the art that various modifications and variations can be made in a channel monitoring apparatus in a WDM system of the present invention without deviating from the spirit or scope of the invention. Thus, it is intended that the present invention cover the modifications and variations of this invention provided they come within the scope of the appended claims and their equivalents.

What is claimed is:

1. A channel monitoring apparatus in a wavelength division multiplexing (WDM) system, the apparatus comprising:

a plurality of diode means for transmitting optical signals having different unique wavelengths used in the WDM system;

multiplexing means for multiplexing the optical signals received from said plurality of diode means;

at least one amplifying means for amplifying a multiplexed signal received from said multiplexing means;

demultiplexing means for demultiplexing a signal amplified by said at least one amplifying means; and channel monitoring means for extracting signals at channel monitoring points disposed between said plural amplifying means and hen monitoring existence/non-existence of each channel and detecting gains of said amplifying means with respect to each channel using arrayed waveguide grating (AWG) module, wherein said channel monitoring means comprises:

a plurality of tapping coupler means each for tapping the multiplexed optical signal at a predetermined percent at said each monitoring point;

optical switching means for selecting one of said monitoring points and optically switching an optical signal tapped by a relevant one of said tap coupler means;

AWG means for dividing the optical signal switched by said optical switching means by channels of the WDM system;

a plurality of trans-impedance circuit means for converting the electric signals converted by said detecting means into voltage values proportional to current values of said signals;

channel multiplexing means for selecting one of signals converted by said trans-impedance circuit means;

fourth amplifying means for amplifying the signal selected by said channel multiplexing means;

analog/digital converting means for converting the signal amplified by said fourth amplifying means into a digital signal before applying it to microprocessing means; and microprocessing means for checking existence/non-existence of each channel and computing gains of said amplifying means with respect to each channel.

2. A channel monitoring apparatus as claimed in claim 1, wherein said channel monitoring means further comprises analog switching means for regulating a gain of the signal selected by said channel multiplexing means according to a relevant channel monitoring point and controlling said fourth amplifying means.

3. A channel monitoring apparatus as claimed in claim 1, wherein said optical switching means corresponds to a 8×1 polymer switch.

4. A channel monitoring apparatus in a wavelength division multiplexing (WDM) system, the apparatus comprising:

a plurality of diode means for transmitting optical signals having different unique wavelengths used in the WDM system;

multiplexing means for multiplexing the optical signals received from said plurality of diode means;

at least one amplifying means for amplifying a multiplexed signal received from said multiplexing means;

demultiplexing means for demultiplexing a signal amplified by said at least one amplifying means; and channel monitoring means for extracting signals at channel monitoring points disposed between said plural amplifying means and then monitoring existence/non-existence of each channel and detecting optical signal to noise ratios (OSNRs) of each channel and gains with respect to each channel using an arrayed waveguide grating (AWG) module having twice as many channel as used in the WDM system.

5. A channel monitoring apparatus as claimed in claim 4, wherein said channel monitoring means comprises:

a plurality of tapping coupler means each for tapping the multiplexed optical signal at a predetermined percent at said each monitoring point;

switching means for selecting one of said monitoring points and optically switching a signal tapped by a relevant one of said tapping coupler means;

AWG means for dividing the optical signal switched by said switching means by twice as many channels as used in the WDM system;

a plurality of detecting means for converting signals received from said AWG means into electric signals;

a plurality of trans-impedance circuit means for converting the electric signals converted by said detecting means into voltage values proportional to current values of said signals;

channel multiplexing means for selecting one of signals converted by said trans-impedance circuit means;

fourth amplifying means for amplifying the signal selected by said channel multiplexing means;

analog/digital converting means for converting the signal amplified by said fourth amplifying means into a digital signal before applying it to microprocessing means; and microprocessing means for checking existence/non-existence of each channel and computing OSNRs of each channel and gains of said amplifying means with respect to each channel.

6. A channel monitoring apparatus as claimed in claim 5, wherein said channel monitoring means further comprises analog switching means for regulating a gain of the signal selected by said channel multiplexing means according to a relevant channel monitoring point and controlling said fourth amplifying means.

7. A channel monitoring apparatus as claimed in claim 5, wherein said switching means corresponds to a 8×1 polymer switch.

8. A method of monitoring channels in a WDM system, the method comprising the steps of:
   producing optical signals each having a unique wavelength used in the system at a plurality of diodes in the WDM system and applying the signals to a multiplexer;
   multiplexing the applied optical signals at said multiplexer and applying a multiplexed signal to one or more amplifiers;
   monitoring each channel at channel monitoring points disposed between said one or more amplifiers at an AWG module having twice as many monitoring points as a number of channels used in the WDM system;
   amplifying the multiplexed signal at said one or more amplifiers and transmitting it to a demultiplexer; and
   demultiplexing a signal amplified at and received from a relevant amplifier and supplying demultiplexed signals to the WDM system.

9. A method of monitoring channels in a WDM system as claimed in claim 8, wherein said step of monitoring each channel comprises the steps of:
   setting monitoring points with respect to each channel;
   tapping the multiplexed optical signals applied through said one or more amplifiers at predetermined percents using each tap coupler coupled to each set monitoring point before applying them to a polymer switch;
   selecting one of optical signals tapped using said tap couplers and switching a selected one to the AWG module using said polymer switch;
   dividing the switched optical signal by each channel used in the WDM system using said AWG module before applying it to each detector;
   converting each optical signal applied by said AWG module into an electrical signal and making current proportional to power of the applied optical signal flow across each trans-impedance circuit using said each detector;
   converting a current value applied by said each detector into a voltage value and applying an analog signal of the voltage value to a channel multiplexer using said each trans-impedance circuit;
   selecting one of the analog signals applied by said each trans-impedance circuit and applying the selected signal to a fourth amplifier using said channel multiplexer;
   amplifying the applied analog signal before applying it to an A/D converter using said fourth amplifier;
   converting an amplified analog signal into a digital signal before applying it to a microprocessor using said A/D converter; and
   checking existence/non-existence of a relevant channel and computing a gain of the relevant channel based upon the signal information applied by said A/D converter using said microprocessor.

10. A method of monitoring channels in a WDM system as claimed in claim 9, wherein said step of monitoring each channel further comprises the step of regulating a gain of the fourth amplifier using an analog switch with respect to the signal selected by said channel multiplexer according to a relevant channel monitoring point.

11. A method of monitoring channels in a WDM system as claimed in claim 9, wherein said step of monitoring each channel further comprises the step of computing a gain flatness with respect to the relevant channel based upon the signal information using said microprocessor.

12. A method of monitoring channels in a WDM system as claimed in claim 9, wherein said step of monitoring each channel further comprises the step of computing a gain stability with respect to the relevant channel based upon the signal information using said microprocessor.

13. A method of monitoring channels in a WDM system as claimed in claim 8, wherein said step of monitoring each channel comprises the steps of:
   setting monitoring points with respect to each channel;
   tapping the multiplexed optical signals applied through said one or more amplifiers at predetermined percents using each tap coupler coupled to each set monitoring point before applying them to a polymer switch;
   selecting one of optical signals tapped using said tap couplers and switching it to the AWG module using said polymer switch;
   dividing the switched optical signal by twice as many channels as used in the WDM system using said AWG module before applying it to each detector;
   converting each optical signal applied by said AWG module into an electrical signal and making current proportional to a strength of the applied optical signal flow across each trans-impedance circuit using said each detector;
   converting a current value applied by said each detector into a voltage value and applying an analog signal of the voltage value to a channel multiplexer using said each trans-impedance circuit;
   selecting one of the analog signals applied by said each trans-impedance circuit and applying the selected signal to a fourth amplifier using said channel multiplexer;
   amplifying the applied analog signal before applying it to an A/D converter using said fourth amplifier;
   converting an amplified analog signal into a digital signal before applying it to a microprocessor using said A/D converter; and
   checking existence/non-existence of a relevant channel and computing a gain and an OSNR of the relevant channel based upon the signal information applied by said A/D converter while observing all channels whether or not they are used for a service using said microprocessor.

14. A method of monitoring channels in a WDM system as claimed in claim 13, wherein said step of monitoring each channel further comprises the step of regulating a gain of the fourth amplifier using an analog switch with respect to the signal selected by said channel multiplexer according to a relevant channel monitoring point.

15. A method of monitoring channels in a WDM system as claimed in claim 13, wherein said step of detecting said OSNR is accomplished in such a way of dividing a signal level by a noise level at a relevant output port of the AWG module.

16. A method of monitoring channels in a WDM system as claimed in claim 13, wherein said step of monitoring each channel further comprises the step of computing a gain flatness with respect to the relevant channel based upon the signal information using said microprocessor.

17. A method of monitoring channels in a WDM system as claimed in claim 13, wherein said step of monitoring each channel further comprises the step of computing a gain stability with respect to the relevant channel based upon the signal information using said microprocessor.

* * * * *